United States Patent [19]
Carr et al.

[11] Patent Number: 5,946,463
[45] Date of Patent: Aug. 31, 1999

[54] METHOD AND SYSTEM FOR AUTOMATICALLY PERFORMING AN OPERATION ON MULTIPLE COMPUTER SYSTEMS WITHIN A CLUSTER

[75] Inventors: Alexander Duncan Carr, Reading; Jeffrey Michael Dangel, Natick; Michael Nelson Galassi, Chelmsford, all of Mass.; Kevin Forress Rodgers, Derry, N.H.; Emy Ying-Mei Tseng, Brookline, Mass.; Thomas Van Weaver, Dripping Springs, Tex.

[73] Assignee: International Business Machines Corporation, Armonk, N.Y.

[21] Appl. No.: 08/681,202

[22] Filed: Jul. 22, 1996

[51] Int. Cl.$^6$ .............................. G06F 13/38; G06F 15/17
[52] U.S. Cl. ...................................... 395/200.31; 395/671
[58] Field of Search ........................... 395/200.5, 200.33, 395/200.31, 671, 676, 673, 674, 675, 677, 200.68, 384, 390, 391, 406, 595, 672

[56] References Cited

U.S. PATENT DOCUMENTS

| | | | |
|---|---|---|---|
| 3,662,401 | 5/1972 | Collins et al. ............................... | 444/1 |
| 4,780,821 | 10/1988 | Crossley .................................. | 364/200 |
| 5,088,034 | 2/1992 | Ihara et al. .............................. | 395/700 |
| 5,201,049 | 4/1993 | Shorter .................................. | 395/650 |
| 5,261,097 | 11/1993 | Saxon ..................................... | 395/650 |
| 5,303,369 | 4/1994 | Borcherding et al. .................. | 395/650 |
| 5,307,490 | 4/1994 | Davidson et al. ...................... | 395/650 |
| 5,319,782 | 6/1994 | Goldberg et al. ....................... | 395/650 |
| 5,375,207 | 12/1994 | Blakely et al. .......................... | 395/200 |
| 5,437,032 | 7/1995 | Wolf et al. .............................. | 395/650 |
| 5,495,610 | 2/1996 | Shing et al. ............................. | 395/600 |
| 5,596,579 | 1/1997 | Yasrebi .................................. | 395/678 |
| 5,659,547 | 8/1997 | Scarr et al. ....................... | 395/182.02 |
| 5,692,193 | 11/1997 | Jagannathan et al. .................. | 395/676 |

OTHER PUBLICATIONS

Mirchandani, Thor; "Building parsers with leopurd", Dr. Dobb's Journal, M&T Publishing, Mar. 1996, v21, n3, p30(7).

Heller, Martin; "Web server programming", Windows Magazine, CMP Publications, Jun. 1996, v7, n6, p273(2).

*Primary Examiner*—Mark H. Rinehart
*Assistant Examiner*—Marc D. Thompson
*Attorney, Agent, or Firm*—Richard A. Henkler; Brian F. Russell; Andrew J. Dillon

[57] ABSTRACT

A method and system for automatically performing one or more operations on multiple computer systems within a cluster are disclosed. In accordance with the present invention, a begin operations command construct is defined within an input file. In addition, an input command indicating one or more operations to be performed on at least two computer systems within the cluster and an end operations command construct are defined. In response to a selected input, one or more operations indicated by the input command are automatically performed on at least two computer systems. In accordance with one embodiment, the begin operations command construct indicates selected computer systems within the cluster on which the one or more operations are to be performed and whether the operations are to be performed on the selected computer systems serially or in parallel.

15 Claims, 3 Drawing Sheets

METHOD AND SYSTEM FOR AUTOMATICALLY PERFORMING AN OPERATION ON MULTIPLE COMPUTER SYSTEMS WITHIN A CLUSTER

BACKGROUND OF THE INVENTION

1. Technical Field

The present invention relates in general to method and system for data processing and in particular to method and system for performing an operation on multiple computer systems within a cluster. Still more particularly, the present invention relates to a method and system for automatically performing an operation on multiple computer systems within a cluster through the use of command construct pairs.

2. Description of the Related Art

Data processing systems are frequently utilized to process data and monitor and manage events in contexts in which reliability and guaranteed access to system resources are of paramount importance. For example, data processing systems are utilized to manage critical databases, automate assembly and production lines, and implement complex control systems. Because of the demands of such mission-critical computing environments, fault tolerant data processing systems were developed. Fault tolerant data processing systems rely on specialized hardware to detect a hardware fault and rapidly incorporate a redundant hardware component into the data processing system in place of the failed hardware component. Although fault tolerant data processing systems can transparently provide reliable and nearly instantaneous recovery from hardware failures, a high premium is often paid in both hardware cost and performance because the redundant components do no processing. Furthermore, conventional fault tolerant data processing systems only provide protection from system hardware failures and do not address software failures, a far more common source of system down time.

In response to the need for a data processing system that provides both high availability of system resources and protection from software failures, cluster architecture was developed. A cluster can be defined as multiple loosely coupled server machines that cooperate to provide clients with reliable and highly available access to a set of system services or resources. Cluster resources can include both hardware and software, such as disks, volume groups, file systems, network addresses, and applications. High availability of the cluster resources is ensured by defining takeover relationships that specify which of the server machines (or nodes) in a cluster assumes control over a group of resources after the server machine that originally owned the group of resources relinquishes control due to reconfiguration of the cluster or failure.

During the course of managing a cluster, a cluster administrator frequently needs to perform administrative and other operations on multiple nodes within the cluster. However, conventional shell script languages utilized in cluster management do not provide a convenient mechanism that permits a cluster administrator to specify operations to be performed on multiple nodes within a cluster. Therefore, in order to perform desired operations on multiple nodes within a cluster, cluster administrators are currently required either to perform the operations on each of the cluster nodes individually or to write a looping shell script that performs the operations on a single node during each iteration of a loop. Both of these approaches have significant drawbacks. In particular, performing the desired operations on each node within the cluster individually is inefficient and impractical for clusters with a large number of member nodes. Furthermore, utilizing a looping shell script to perform the operations does not permit concurrent execution of the operations on multiple nodes and does not readily enable the execution of the operations to react to exception conditions or individual node failures.

As should thus be apparent, a need exists for a shell script extension which permits specified operations to be automatically performed on multiple nodes within a cluster. In particular, a need exists for a shell script extension that permits operations to be performed concurrently on multiple nodes and enables execution of the operations to react to exception conditions and node failures.

SUMMARY OF THE INVENTION

It is therefore one object of the present invention to provide a method and system for data processing.

It is another object of the present invention to provide a method and system for performing an operation on multiple computer systems within a cluster.

It is yet another object of the present invention to provide a method and system for automatically performing an operation on multiple computer systems through the use of command construct pairs.

The foregoing objects are achieved as is now described. A method and system for automatically performing one or more operations on multiple computer systems within a cluster are disclosed. In accordance with the present invention, a begin operations command construct is defined within an input file. In addition, an input command indicating one or more operations to be performed on at least two computer systems within the cluster and an end operations command construct are defined. In response to a selected input, one or more operations indicated by the input command are automatically performed on at least two computer systems. In accordance with one embodiment, the begin operations command construct indicates selected computer systems within the cluster on which the one or more operations are to be performed and whether the operations are to be performed on the selected computer systems serially or in parallel.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
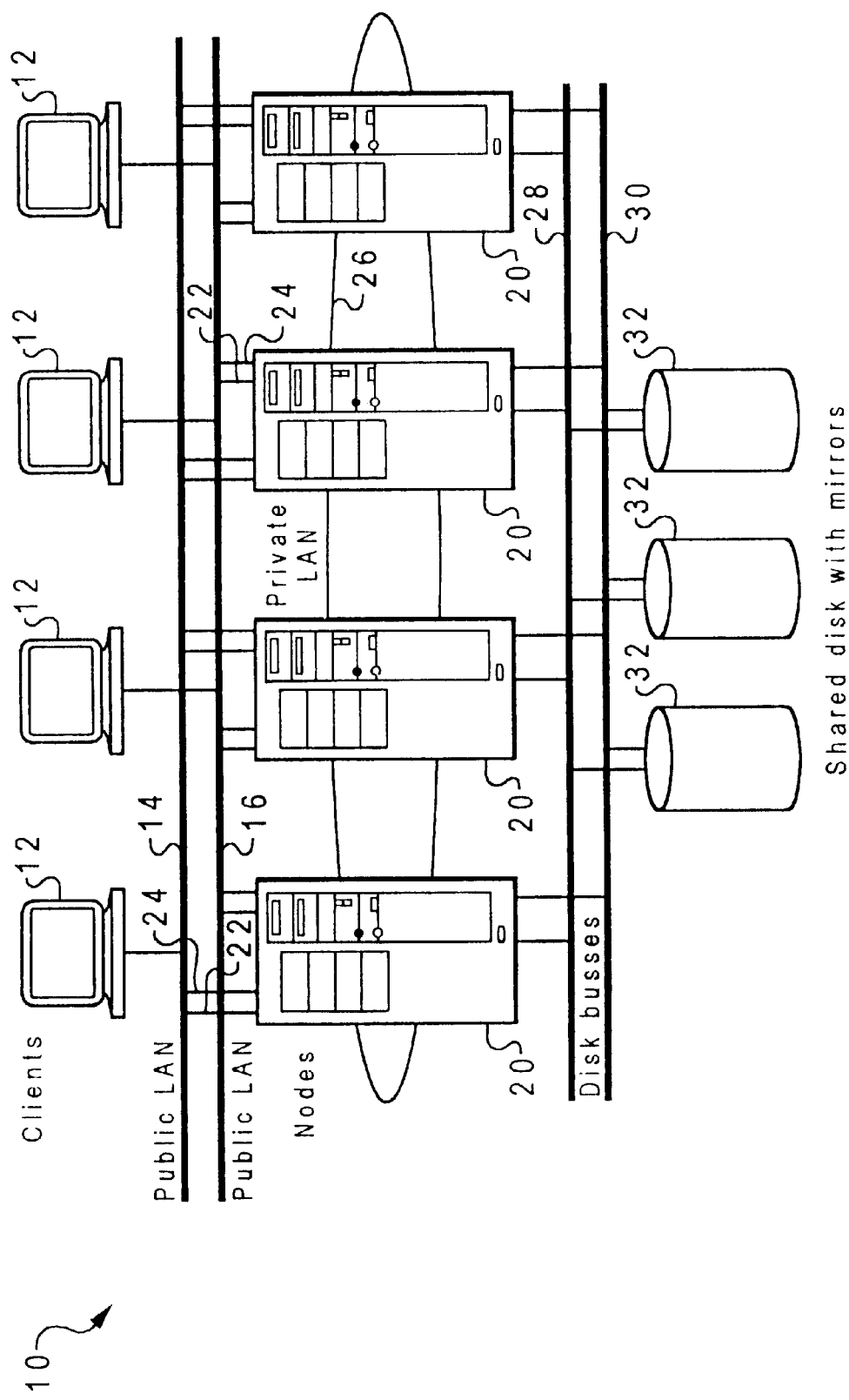
FIG. 1 depicts an illustrative embodiment of a cluster multi-processing system including multiple processing nodes.

With reference now to the figures and in particular with reference to FIG. 1, there is illustrated a cluster 10 including multiple nodes 20 upon which selected operations may be automatically performed in accordance with the present invention. As illustrated, cluster 10 is a multi-processor data processing system including one or more clients 12, which each comprise a personal computer or workstation, for example. Each of clients 12 runs a "front end" or client application that issues service requests to server applications running on nodes 20. A client 12 communicates with other clients 12 and with nodes 20 via one of public Local Area Networks (LANs) 14 and 16, which can comprise Ethernet, Token-Ring, FDDI or other networks. Communication across public LANs 14 and 16 is regulated by a communication protocol such as TCP/IP.

In order to ensure that cluster resources are highly available to clients 12, cluster 10 includes multiple nodes 20, which preferably comprise uniprocessor or multi-processor data processing systems, such as the RISC System/6000 available from IBM Corporation. In contrast to fault tolerant systems, which include idle redundant hardware, each node 20 within cluster 10 runs a server or "backend" application, which performs tasks in response to service requests issued by clients 12. As illustrated, in order to eliminate as many single points of failure as possible, each of clients 20 has at least two network adapters for each connected network: a service network adapter 22 and a standby network adapter 24. Service network adapter 22, which provides the primary connection between a node 20 and one of public LANs 14 and 16, is assigned an IP address that is published to application programs running on clients 12. If a service network adapter 22 of one of nodes 20 fails, High Availability Cluster Multi-Processing (HACMP) software running on the node 20 substitutes the IP address assigned to standby network adapter 24 for the IP address assigned to the failed service network adapter 22 in order to maintain high availability of cluster resources and services. Similarly, if a local node 20 is designated to service requests addressed to a peer node 20 should the peer node 20 fail, standby network adapter 24 of local node 20 is assigned the IP address of the service network adapter 22 of peer node 20 upon failure. In addition to the communication path provided by public LANs 14 and 16, nodes 20 can communicate across private LAN 26, which provides peer-to-peer communication between nodes 20, but does not permit access by clients 12. Private LAN 26 can be implemented utilizing an Ethernet, Token-Ring, FDDI, or other network. Alternatively, a serial communication channel such as a SCSI-2 differential bus or RS-232 serial line can be utilized.

As depicted, cluster 10 further includes shared external disks 32, which are accessible to each node 20 via redundant disk busses 28 and 30. Shared disks 32 store mission-critical data, which is typically mirrored to provide data redundancy. Shared disks 32, volume groups, file systems, and applications stored within shared disks 32, and IP addresses assigned to network adapters 22 and 24 together form a set of cluster resources essential to processing, which the architecture of cluster 10 makes highly available to clients 12. The operation and components of cluster multi-processing systems such as cluster 10 are described in greater detail in *High Availability Cluster Multi-Processing* 4.1 *for AIX: Concepts and Facilities,* which is available from IBM Corporation as Publication No. SC23-2767-01 and is incorporated herein by reference.

Figure 2:
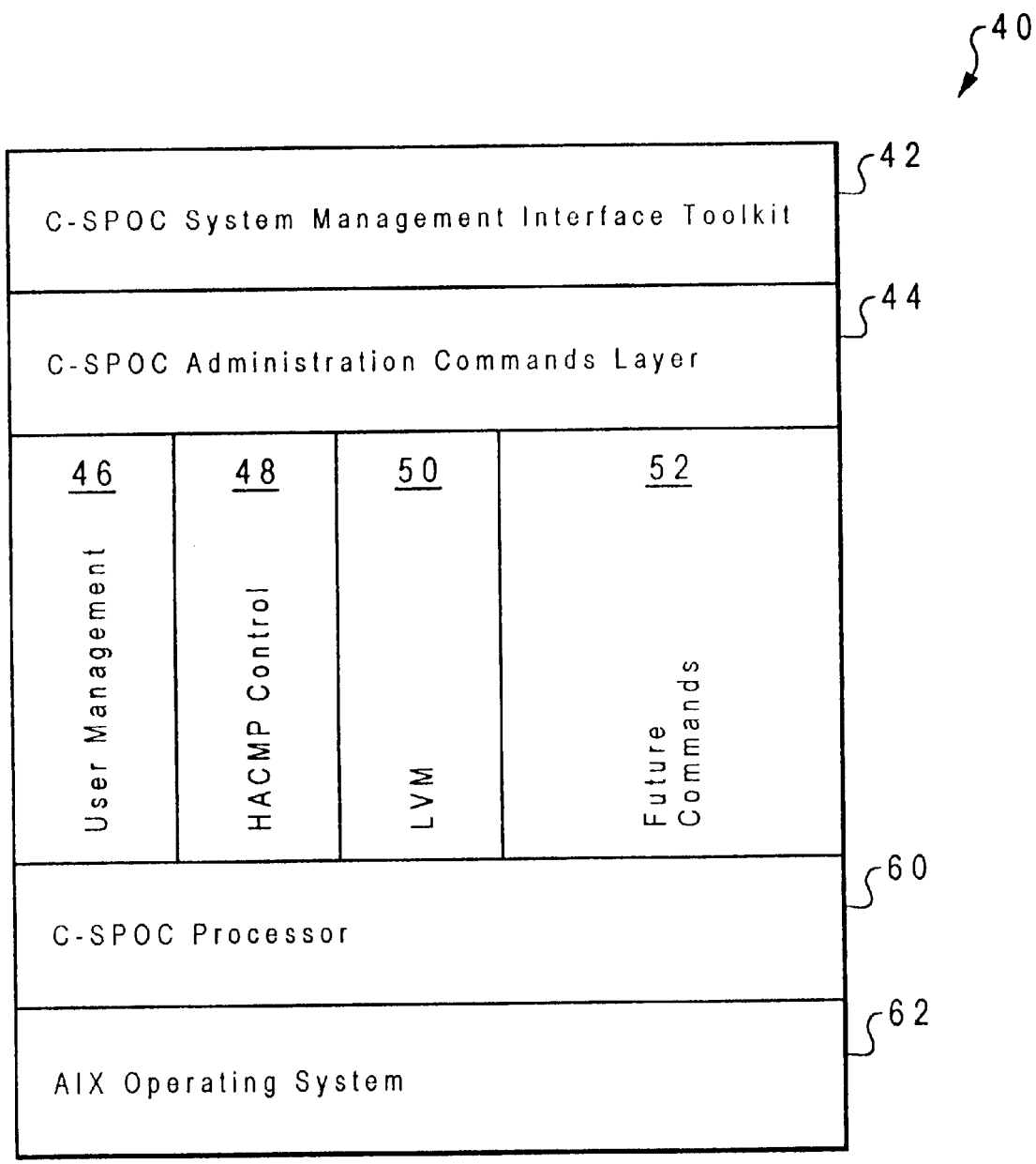
FIG. 2 is a layer diagram illustrating the logical interrelationship of the software on each node of the cluster depicted in FIG. 1.

Referring now to FIG. 2, there is depicted a layer diagram, indicated generally at reference numeral 40, which illustrates the logical interrelationship of the software running on each node 20 of cluster 10. As illustrated, the topmost layer of software configuration 40 is a Cluster Single Point Of Control (C-SPOC) System Management Interface Toolkit (SMIT) 42. SMIT 42 preferably comprises a graphical user interface that presents a cluster administrator with an assortment of icons, windows, dialog boxes and other graphical objects that permit the cluster administrator to access the C-SPOC functionality of cluster 10 in a graphical and intuitive manner. User inputs to SMIT 42 are utilized to generate a C-SPOC administration command supported by C-SPOC administration commands layer 44. As depicted, the C-SPOC commands supported by C-SPOC administration commands layer 44 can be categorized as user management commands 46, HACMP control commands 48, and Logical Volume Manager (LVM) commands 50. C-SPOC administration commands layer 44 is flexible and extensible so that future cluster-aware commands 52 can also be developed and supported.

User management commands 46 include the following:

cl__lsuser <nodelist> - list users on specified nodes;
cl__lsgroup <nodelist> - list groups on specified nodes;
cl__chuser <nodelist> - change the attributes of a user on specified nodes;
cl__chgroup <nodelist> - change the attributes of a group on specified nodes;
cl__mkuser <nodelist> - create a new user on specified nodes;
cl__mkgroup <nodelist> - create a new group on specified nodes;
cl__rmuser <nodelist> - remove a user from specified nodes; and
cl__rmgroup <nodelist> - remove a group from specified nodes.

HACMP control commands 48 include the following:

cl__rc.cluster <nodelist> - start cluster operation on specified nodes; and
cl__clstop <nodelist> - stop cluster operation on specified nodes.

LVM commands 50 include the following:

cl__lslv <LV> -automatically locates node with current access to specified shared logical volume (LV) and displays information concerning the LV;
cl__lslf <FS> - automatically locates node with current access to specified file system (FS) and displays information concerning the FS;
cl__lsvg <VG> - automatically locates node with current access to specified shared volume group (VG) and displays information concerning the VG;
cl__chfs <FS> - change attributes of a shared FS on node with current access to the FS;
cl__chlv <LV> - change attributes of a shared LV on node with current access to the LV;
cl__rmfs <FS> - remove shared FS on node with current access to the FS; and
cl__rmlv <LV> - remove shared LV on node with current access to the LV.

In accordance with the present invention, the C-SPOC commands supported by C-SPOC administration commands layer 44 permit a cluster administrator to perform administration tasks in an automated fashion on a specified set nodes, thereby allowing a cluster 10 to be administered as a single system.

Referring again to FIG. 2, each C-SPOC command supported by C-SPOC administration commands layer 44 is implemented as an execution plan that is interpreted and executed by C-SPOC processor 60. According to the illustrated embodiment of the present invention, C-SPOC processor 60 provides the mechanism by which C-SPOC commands generated from inputs to SMIT 42 are distributed to and executed on multiple nodes 20 of cluster 10. C-SPOC processor 60, C-SPOC administration commands layer 44, and C-SPOC SMIT 42 all request system services such as memory allocation and thread scheduling from AIX (Advanced Interactive eXecutive) operating system 62, which provides these and other services as features of a background computing environment.

Figure 3:
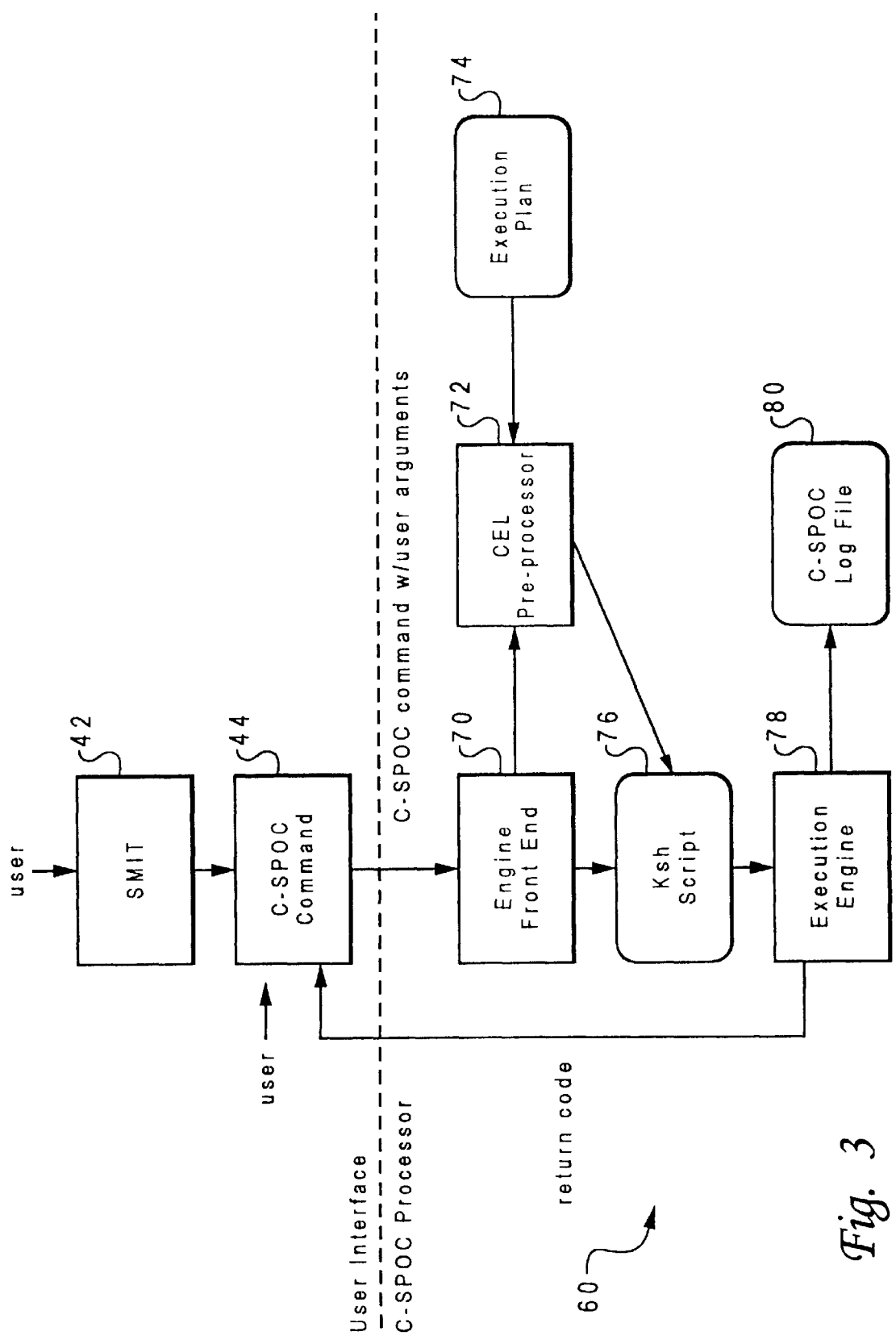
FIG. 3 is a process flow diagram depicting the manner in which the software illustrated in FIG. 2 processes a Cluster Single Point of Control (C-SPOC) command in accordance with the present invention.

With reference now to FIG. 3, there is illustrated a process flow diagram depicting the manner in which the software illustrated in FIG. 2 processes a C-SPOC command in accordance with the present invention. As indicated, a user (e.g., a cluster administrator) provides inputs to SMIT 42 that specify one of the user management commands 46, HACMP control commands 48, or LVM commands 50 listed above. In response to the user inputs, SMIT 42 generates the specified C-SPOC administration command 44. Alternatively, the user can enter C-SPOC command 44 directly from the command line. C-SPOC command 44 is then passed to engine front end 70 of C-SPOC processor 60.

Engine front end 70 is a single korn shell (ksh) script that provides an entry point into C-SPOC processor 60. In response to receipt of C-SPOC command 44 as an argument, engine front end 70 attempts to locate a korn shell (ksh) script 76 corresponding to C-SPOC command 44, and if ksh script 76 is not found, engine front end 70 searches for an execution plan 74, which is a prebuilt Command Execution Language (CEL) script. This search ordering permits a cluster administrator to precompile execution plans into ksh scripts in order to perform cluster administration tasks with greater efficiency. If engine front end 70 locates execution plan 74 instead of ksh script 76, engine front end 70 initiates execution of CEL pre-processor (celpp) 72, which translates execution plan 74 into ksh script 76. In addition, celpp appends ksh code that generates timestamp and execution information and appends the log information to C-SPOC log file 80.

In accordance with the present invention, the CEL in which execution plan 74 is written includes command construct pairs that delimit a selected group of commands which are to be performed on specified multiple nodes 20 within cluster 10. These commands constructs are as follows:

--- try_serial <nodelist> - execute the following commands on
    the specified nodes in serial order;
end_s - delimits a block of statements to be executed on the
    specified nodes serially.
try_parallel <nodelist> - execute the following commands on
    each specified node concurrently.
end_p - delimits a block of statements to be executed
    concurrently on specified nodes.
except - defines an exception condition that, should it occur
    during the execution of preceding commands on
    a remote node, causes the subsequent commands
    to be executed.
end_e - delimits a block of statements to be executed upon the
    occurrence of an exception condition.
others - execute the following commands if none of the
    preceding exception conditions are true.
end_o - delimits the block of commands executed following an
    others command.

---

When processed by celpp 72, the foregoing command construct pairs are converted into loop and case statements found in conventional ksh scripts. For example, if a cluster administrator desires to verify communication with each node in a specified list serially and identify nodes with which communication could not be established, the cluster administrator could enter a C-SPOC command that corresponds to the following CEL execution plan:

---

```
%try_serial n NODE_LIST
    ls /
    %except node_unreachable
        print "could not reach $n"
    %end_e
%end_s
```

---

In response to receiving the above CEL execution plan as an input, celpp 72 would generate the following ksh output:

---

```
function cel_f1
{
    cel_s1=/tmp/cel_sl_$$
    try_err=${cel_s1}.err
    try_out=${cel_s1}.out
    trap "rm -f ${cel_s1}_*.rc" EXIT
    IFS=,
    for n in $NODE_LIST; do
        cdsh $cel_s1 $n cexit ls /
        cel_rc='cat ${cel_s1}_$n.rc'
        case $cel_rc in
            node_unreachable)
                print "could not reach $n"
            ;;
        esac
    done
}
cel_f1
```

---

If the CEL execution plan were modified to include a try_parallel statement in place of the try_serial statement, the ksh script generated by celpp 72 would be as follows:

---

```
function cel_f1
{
    cel_s1=/tmp/cel_s1_$$
    try_err=${cel_s1}.err
    try_out=${cel_s1}.out
    trap "rm -f ${cel_s1}_*.rc" EXIT
    IFS=,
    for n in $NODE_LIST; do
        cel_rc='cat ${cel_s1}_$n.rc'
        case $cel_rc in
            node_unreachable)
                print "could not reach $n"
            ;;
        esac
    done
}
cel_f1
```

---

In the ksh scripts given above, the statements using the .err, .out, and .rc syntax create temporary files on nodes in the nodelist to contain the error messages, standard outputs, and exit status, respectively, generated by the execution of the try statements. The trap statements ensure that these temporary files are removed from the nodes regardless of how the function returns. As will be appreciated by those skilled in the art, try_serial, try_parallel, except, and others command construct pairs can be nested to provide more complex command functionality.

Still referring to FIG. 3, after ksh script 76 is located by engine front end 70 or generated by celpp 72, ksh script 76 is placed within a wrapper script that is responsible for status-gathering and for storing the standard output and error information returned from remote nodes. Ksh script 76 is then passed in the wrapper script to execution engine 78. In a preferred embodiment of the present invention, execution engine 78 comprises a PERL script that executes the commands within ksh script 76 on a specified set of nodes 20 utilizing the UNIX utility rsh. For each command, execution engine 78 waits until outputs or exception conditions are returned from all relevant nodes before continuing execution. As illustrated, execution results, issued messages, and recovery information generated by the execution of ksh script 76 are written to C-SPOC log file 80 by execution engine 78.

As has been described, the present invention provides an improved method and system for automatically performing operations on multiple nodes within a cluster. The functionality provided by the command construct pairs introduced by the present invention reduces the amount of code and time required to perform cluster administration and other tasks on multiple nodes. In addition, because the command construct pairs access predetermined execution plans, the potential for error which would arise if code were written separately for each command is minimized.

While the invention has been particularly shown and described with reference to a preferred embodiment, it will be understood by those skilled in the art that various changes in form and detail may be made therein without departing from the spirit and scope of the invention. For example, although the present invention has been described with reference to an illustrative embodiment in which software implementing the present invention is stored within and executed on a multi-processing cluster, such software can alternatively be embodied as a computer program product residing within recordable media such as magnetic and optical disks or transmission media such as digital and analog communications links.

What is claimed is:

1. A method for automatically performing one or more operations utilizing a plurality of computer systems within a cluster, said method comprising:

specifying an input command within an input file, wherein said input command indicates one or more operations to be performed by at least two computer systems among said plurality of computer systems;

defining a command construct within said input file that delimits syntax within said input file that forms said input command; and in response to receipt of a selected input:

parsing said input file and generating a script, said script including computer executable commands that, when executed by one of said at least two computer systems in said cluster cause said one or more operations to be performed;

transmitting said executable commands to at least one of said at least two computer systems; and having said at least two computer systems automatically execute said executable commands such that said one or more operations are performed.

2. The method of claim 1, wherein said at least two computer systems are specified within said input file.

3. The method of claim 1, wherein each of said at least two computer systems performs all of said one or more operations indicated by said input command concurrently with all others of said at least two computer systems.

4. The method of claim 1, wherein said one or more operations are all performed by a first of said at least two computer systems and thereafter are all performed by a second of said at least two computer systems.

5. A cluster data processing system, comprising:

a plurality of computer systems, wherein each computer system among said plurality of computer systems includes a memory;

a communications link connecting each of said plurality of computer systems with at least one other of said plurality of computer systems for communication; and a cluster command processor stored within said memory of each of said plurality of computer systems, said cluster command processor being executable by the associated computer system, wherein a cluster command processor automatically initiates execution of one or more operations by at least two computer systems within said cluster in response to receipt of a cluster command construct delimiting syntax of an input command indicating said one or more operations, wherein said cluster command processor includes:

means for parsing said cluster command construct and said input command to generate a script, said script including computer executable commands that, when executed by one of said at least two computer systems in said cluster, cause said one or more operations to be performed;

means for transmitting said executable commands to at least one of said at least two computer systems; and means, responsive to receipt of said executable commands for automatically executing said executable commands utilizing an associated one of said at least two computer systems such that said one or more operations are performed.

6. The cluster data processing system of claim 5, wherein said cluster command processor initiates concurrent execution of all of said one or more operations by each of said at least two computer systems in response to receipt of a parallel cluster command construct delimiting syntax of said input command indicating said one or more operations.

7. The cluster data processing system of claim 5, wherein said cluster command processor initiates execution of said one or more operations by a first of said at least two computer systems and thereafter by a second of said at least two computer systems in response to receipt of a serial cluster command construct delimiting syntax of said input command indicating said one or more operations.

8. The cluster data processing system of claim 5, and further comprising:

an input file stored within said memory at one of said plurality of computer systems, said input file containing said cluster command construct and said input command, wherein said at least two computer systems are specified within said input file.

9. The method of claim 1, wherein said step of defining a command construct within said input file that delimits syntax of said input command comprises the step of defining a begin operations command construct and an end operations command construct that delimit syntax of said input command.

10. A program product for automatically performing one or more operations on a plurality of computer systems within a cluster, said program product comprising:

a cluster command processor executable by a computer system among said plurality of computer systems, wherein said cluster command processor automatically initiates execution of one or more operations by at least two computer systems within said cluster in response to receipt of a cluster command construct delimiting syntax of an input command indicating said one or more operations, said cluster command processor including:

instruction code for causing a computer system among said plurality of computer systems to parse said cluster command construct and said input command to generate a script, said script including computer executable commands that, when executed by one of said at least two computer systems in said cluster, cause said one or more operations to be performed;

instruction code for causing a computer system among said plurality of computer systems to transmit said executable commands to at least one of said at least two computer systems; and instruction code, responsive to receipt of said executable commands, for causing a computer system among said at least two computer systems to automatically execute said executable commands such that said one or more operations are performed; and an information bearing media bearing said cluster command processor.

11. The program product of claim 10, wherein said cluster command processor initiates concurrent execution of all of said one or more operations by each of said at least two computer systems in response to receipt of a parallel cluster command construct delimiting syntax of said input command indicating said one or more operations.

12. The program product of claim 10, wherein said cluster command processor initiates execution of said one or more operations by a first of said at least two computer systems and thereafter by a second of said at least two computer systems in response to receipt of a serial cluster command construct delimiting syntax of said input command indicating said one or more operations.

13. The method of claim 1, wherein:

defining a command construct comprises defining a command construct that specifies a condition upon an occurrence of which said one or more operations indicated by said input command delimited by said command construct are to be performed; and having said at least two computer systems within said cluster automatically perform said one or more operations comprises having said at least two computer systems automatically perform said one or more operation only if an occurrence of said condition occurs.

14. The cluster data processing system of claim 5, wherein:

said cluster command construct specifies a condition upon an occurrence of which said one or more operations indicated by said input command delimited by said command construct are to be performed; and said cluster command processor automatically initiates execution of said one or more operations only if an occurrence of said condition occurs.

15. The program product of claim 10, wherein:

said cluster command construct specifies a condition upon an occurrence of which said one or more operations indicated by said input command delimited by said command construct are to be performed; and said cluster command processor automatically initiates execution of said one or more operations only if an occurrence of said condition occurs.

* * * * *